(12) United States Patent
Almeida et al.

(10) Patent No.: US 11,467,131 B2
(45) Date of Patent: Oct. 11, 2022

(54) SYSTEMS AND METHODS FOR DETECTING RESONANT FREQUENCY OF MEMS MIRRORS

(71) Applicant: BEIJING VOYAGER TECHNOLOGY CO., LTD., Beijing (CN)

(72) Inventors: Sergio Almeida, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 118 days.

(21) Appl. No.: 16/907,061

(22) Filed: Jun. 19, 2020

(65) Prior Publication Data

US 2021/0396713 A1    Dec. 23, 2021

(51) Int. Cl.
| | |
|---|---|
| G01N 29/12 | (2006.01) |
| G01N 29/46 | (2006.01) |
| G01H 13/00 | (2006.01) |
| G02B 26/08 | (2006.01) |

(52) U.S. Cl.
CPC ............ *G01N 29/12* (2013.01); *G01H 13/00* (2013.01); *G01N 29/46* (2013.01); *G01N 2291/014* (2013.01); *G02B 26/0833* (2013.01)

(58) Field of Classification Search
CPC .. G01N 29/12; G01N 29/46; G01N 2291/014; G01H 13/00; G02B 26/0833

USPC .......................................................... 73/579
See application file for complete search history.

(56) References Cited

U.S. PATENT DOCUMENTS

| | | |
|---|---|---|
| 6,275,326 B1 | 8/2001 | Bhalla et al. |
| 2011/0181931 A1 | 7/2011 | Luft et al. |

FOREIGN PATENT DOCUMENTS

WO    WO-2010088011 A1 *   8/2010   ............. G01D 21/00

OTHER PUBLICATIONS

International Search Report issued in corresponding International Application No. PCT/US2021/024402, dated Jul. 15, 2021, 4 pages.
(Continued)

*Primary Examiner* — Lisa M Caputo
*Assistant Examiner* — Rose M Miller
(74) *Attorney, Agent, or Firm* — Bayes PLLC

(57) ABSTRACT

Embodiments of the disclosure provide systems and methods for detecting a resonant frequency of an optical beam-steering device. The method may include driving the optical beam-steering device with a driving signal oscillating at a plurality of frequencies. The method may also include detecting, by an acoustic detector, an acoustic signal caused by a movement of the optical beam-steering device. The method may further include analyzing a spectrum, by a controller, of the acoustic signal. The method may additionally include determining, by the controller, the resonant frequency of the optical beam-steering device based on the spectrum.

20 Claims, 5 Drawing Sheets

(56) References Cited

OTHER PUBLICATIONS

Written Opinion of the International Searching Authority issued in corresponding International Application No. PCT/US2021/024402, dated Jul. 15, 2021, 4 pages.
Changfeng Xia et al., "A Position Feedback Solution Based on the Acoustic Signal Produced by Electrostatically Driven MEMS Scanning Mirror," 2017 IEEE 12th International Conference on Nano/Micro Engineered and Molecular Systems (NEMS), Aug. 29, 2017, pp. 558-561.

* cited by examiner

SYSTEMS AND METHODS FOR DETECTING RESONANT FREQUENCY OF MEMS MIRRORS

TECHNICAL FIELD

The present disclosure relates to an optical beam-steering device, such as a microelectromechanical system (MEMS) mirror used in light detection and ranging (LiDAR) systems, and more particularly to, systems and methods for detecting resonant frequencies of the MEMS mirror using an acoustic detection system.

BACKGROUND

LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

Optical components, e.g., a MEMS mirror, used in LiDAR systems includes a micro mirror that can be moved (e.g., rotated) by an actuator to reflect (and steer) incident laser beams a range of directions in order to scan a field of view (FOV). The MEMS mirror can be a single micro mirror, or an array of micro mirrors integrated into a micromachined mirror assembly. When operating under a certain frequency, a MEMS mirror oscillates and rotates for a certain tilting angle, thus reflecting light beams at a reflection angle. Such a frequency is known as the resonant frequency of the MEMS mirror. Therefore, it is important to know the resonant frequency and its corresponding mirror tilting angle in order to effectuate the desired tilting movements of the MEMS mirror during operation.

However, due to fabrication process variations, resonant frequency of each of the MEMS mirror of the same array of micromachined mirror assembly(s) may vary. For example, a structure etched on a single crystalline wafer may suffer from greater fabrication process variations (e.g., the lower part of the structure is narrower than the design due to the etching process) when the structure is closer to the edge of the wafer compared to if the structure is located in the center of the wafer. Thus, MEMS mirrors in the same array of micromachined mirror assembly may have different resonant frequencies. Measuring the resonant frequency of each MEMS mirror becomes especially important when multiple MEMS mirrors need to be synchronized to operate in the same MEMS array.

Conventionally, resonant frequencies of MEMS mirrors are detected using optical detection methods. For example, FIG. 1 illustrates a schematic diagram of a prior art resonant frequency detection system 100 (hereafter, "prior art system 100") for detecting the resonant frequency of a MEMS mirror. Prior art system 100 shown in FIG. 1 includes a laser source 102 and a light detector 103 for detecting the resonant frequency of a MEMS mirror 110 in a micromachined mirror assembly 101 (also referred to as mirror assembly 101). At its resonant frequency, MEMS mirror 110 can oscillate and rotate around an axis 109 for a certain tilting angle (e.g., tilting angle (3), thereby directing incident laser beams from a laser source towards a plurality of directions.

Prior art system 100 uses a driving circuit to conduct a frequency sweeping over a range of frequencies to drive MEMS mirror 110 to oscillate. When the sweeping frequency is the resonant frequency, MEMS mirror 110 will resonant and rotate around axis 109 to a corresponding tilting angle. Prior art system 100 then uses the optical sensing system to sense the tilting angle. For example, laser source 102 emits a laser beam to a reflective surface of MEMS mirror 110. The laser beam may be reflected by the reflective surface of MEMS mirror 110 and then received by light detector 103. The tilting angle of MEMS mirror 110 can be determined based on a position of a light spot on the surface of light detector 103 where the reflected laser beam is received. Prior art system 100 then associates the determined titling angle with the resonant frequency.

However, resonant frequency detection systems relying on optical sensing, such as prior art system 100 has various drawbacks. In particular, the performance of these detection systems is limited at large tilting angles. For example, FIG. 1 illustrates a scenario that light detector 103 fails to receive a reflected laser beam 104. The failure may be caused by the small surface dimensions of light detector 103, insufficient to capture the reflected beam at large tilting angle of MEMS mirror 110. As a result, resonant frequencies for mirrors with large mirror tilting angles will go undetected by prior art system 100.

On the other hand, misalignment of the optical detection system and the mirror assembly may also contribute to errors of the detection. However, aligning the optical detection system to a MEMS mirror for each setup is unpractical for large batch wafer level testing.

Embodiments of the disclosure address the above problems by providing an acoustic method for detecting the resonant frequency of the MEMS mirror.

SUMMARY

Embodiments of the disclosure provide a method for detecting a resonant frequency of an optical beam-steering device. The method may include driving the optical beam-steering device with a driving signal oscillating at a plurality of frequencies. The method may also include detecting, by an acoustic detector, an acoustic signal caused by a movement of the optical beam-steering device. The method may further include analyzing a spectrum, by a controller, of the acoustic signal. The method may additionally include determining, by the controller, the resonant frequency of the optical beam-steering device based on the spectrum.

Embodiments of the disclosure also provide a system for detecting a resonant frequency of an optical beam-steering device. The system may include an acoustic detector configured to detect an acoustic signal caused by a movement of the optical beam-steering device when driven by a driving signal oscillating at a plurality of frequencies. The system may also include a controller operatively coupled to the acoustic detector. The controller may be configured to analyze a spectrum of the acoustic signal. The controller may also be configured to determine the resonant frequency of the optical beam-steering device based on the spectrum.

Embodiments of the disclosure further provide a method for detecting resonant frequencies of MEMS mirrors. The method may include placing an acoustic detector in a proximity of a first MEMS mirror. The method may also include driving the first MEMS mirror with a driving signal oscillating at a plurality of frequencies. The method may further include detecting, by the acoustic detector, a first acoustic signal caused by a movement of the first MEMS mirror. The method may additionally include moving the acoustic detector into a proximity of a second MEMS mirror. The method may further include driving the second MEMS mirror with the driving signal. The method may additionally include detecting, by the acoustic detector, a second acoustic signal caused by a movement of the second MEMS mirror. The method may further include determining, by a controller, the resonant frequencies of the first and second MEMS mirrors based on the first and second acoustic signals, respectively.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
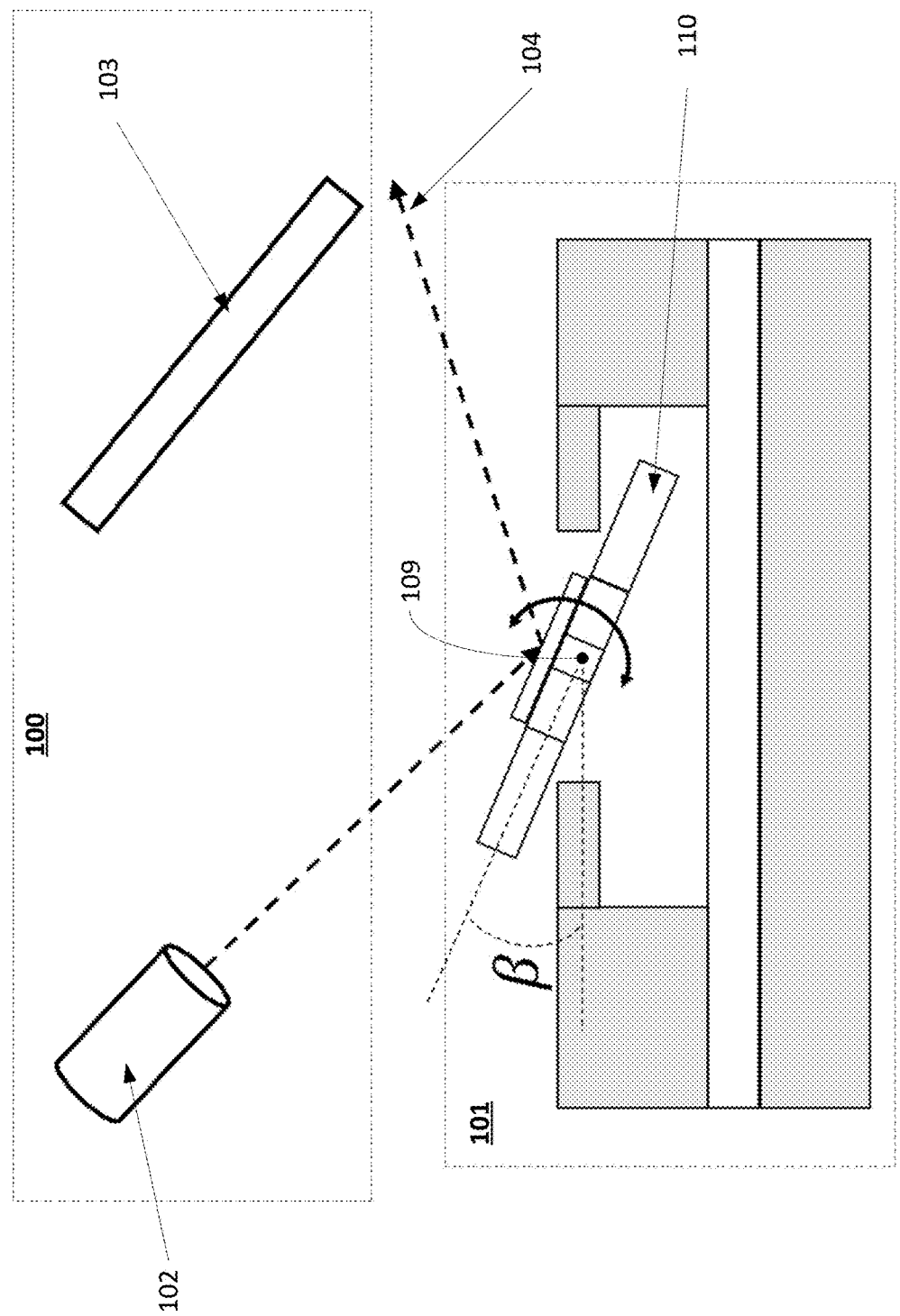
FIG. 1 illustrates a schematic diagram of a prior art resonant frequency detection system, according to embodiments of the disclosure.

Embodiments of the present disclosure provide systems and methods for detecting resonant frequencies of MEMS mirrors used in LiDAR systems. Compared to a prior art resonant frequency detection system illustrated in FIG. 1, the disclosed system and method do not use a laser source and/or light detector to detect a tilting angle of a MEMS mirror in response to the corresponding frequency applied to the mirror. Instead, the system uses an acoustic detector to detect an acoustic signal caused by the tilting movement of the MEMS mirror. The resonant frequency of the MEMS mirror can be determined by analyzing a spectrum of the acoustic signal. Because a larger tilt angle causes a higher sound pressure, the size of the title angle is encoded in the amplitude of the acoustic signal. Accordingly, a mapping between the resonant frequency and the corresponding tilting angle can be determined by the acoustic measurements.

Embodiments of the present disclosure improve the efficiency and effectiveness of systems and methods for detecting resonant frequencies of a MEMS mirror. Comparing with the conventional optical detection devices, an acoustic detection device does not require an alignment between the detection device and the MEMS mirror to perform accurate detections, which is suitable for batch wafer level testing. For example, the disclosed detection system can detect resonant frequencies of multiple MEMS mirrors sequentially without conducting any special alignment. Because the disclosed detection systems and methods do not rely on reflecting and receiving optical beams, they are also not limited by the titling angle or detection size, a problem shown in FIG. 1. In addition, the disclosed systems can conduct the detection in an environment with less lighting constraints compared to the conventional optical detection systems. For example, prior art system 100 has to operate in a dark room to avoid interference to the optical detection signals, while the disclosed systems can operate under any lighting conditions.

Figure 2:
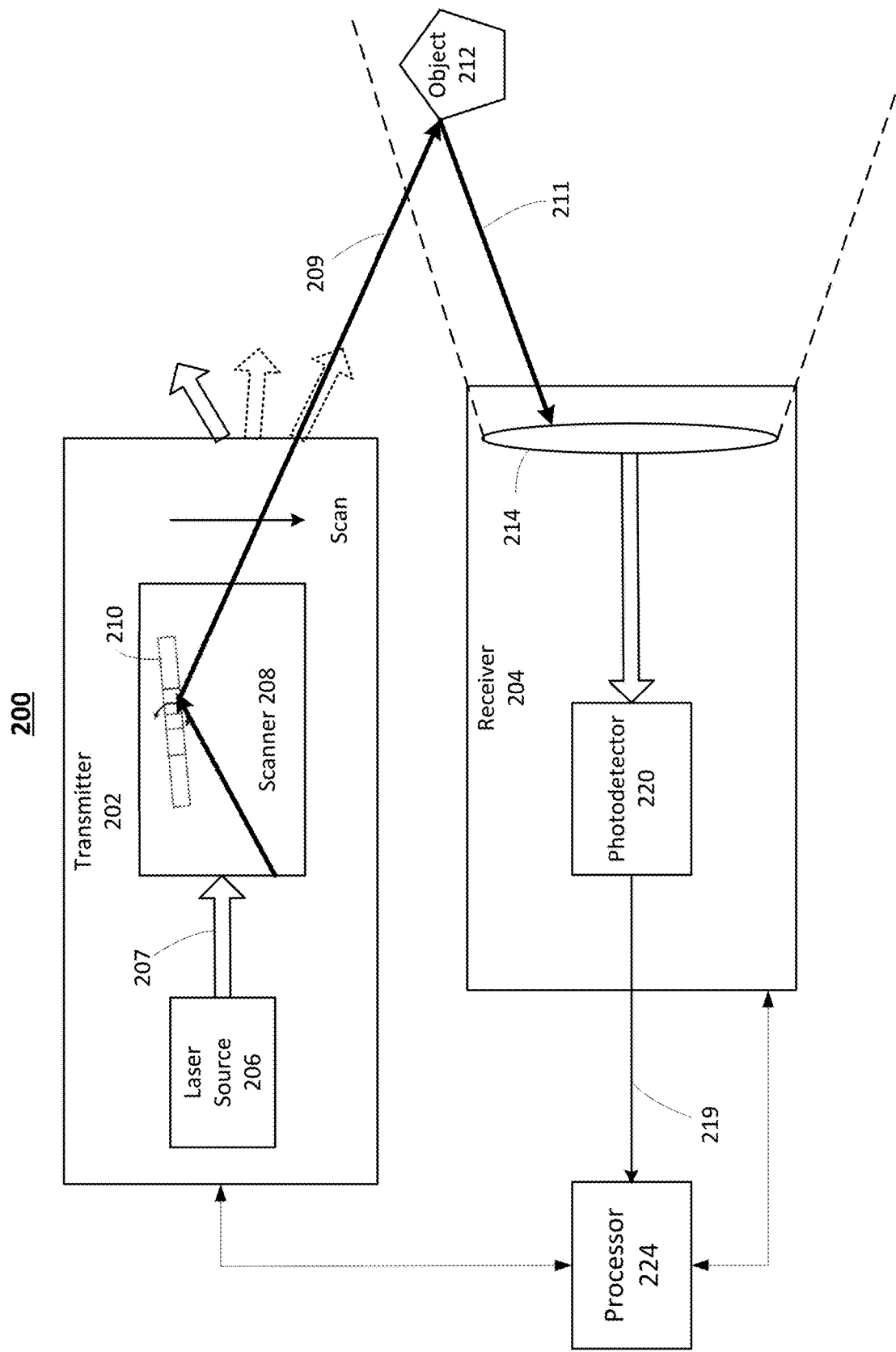
FIG. 2 illustrates a block diagram of an exemplary LiDAR system, according to embodiments of the disclosure.

FIG. 2 illustrates a block diagram of an exemplary LiDAR system 200, according to embodiments of the disclosure. LiDAR system 200 may include a transmitter 202 and a receiver 204. Transmitter 202 may emit laser beams along multiple directions. Transmitter 202 may include one or more laser sources 206 and a scanner 208.

Transmitter 202 can sequentially emit a stream of pulsed laser beams in different directions within a scan range (e.g., a range in angular degrees), as illustrated in FIG. 2. Laser source 206 may be configured to provide a laser beam 207 (also referred to as "native laser beam") to scanner 208. In some embodiments of the present disclosure, laser source 206 may generate a pulsed laser beam in the ultraviolet, visible, or near infrared wavelength range.

In some embodiments of the present disclosure, laser source 206 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser source may be used as laser source 206 for emitting laser beam 207.

Scanner 208 may be configured to emit a laser beam 209 to an object 212 in a direction within a range of scanning angles. In some embodiments consistent with the present disclosure, scanner 208 may include a micromachined mirror assembly having a rotational mirror, such as MEMS mirror 210. Object 212 may be made of a wide range of materials including, for example, non-metallic objects, rocks, rain, chemical compounds, aerosols, clouds and even single molecules. The wavelength of laser beam 209 may vary based on the composition of object 212. In some embodiments, at each time point during the scan, scanner 208 may emit laser beam 209 to object 212 in a direction within a range of scanning angles by rotating the micromachined mirror assembly. For example, MEMS mirror 210, at its rotated angle, may deflect the laser beam 207 generated by laser sources 206 to the desired direction, which becomes laser beam 209. In some embodiments, MEMS mirror 210 may oscillate at its resonant frequency during the operation to create a tilting movement of the micromachined mirror assembly to form the desired scanning angle. The resonant frequency of MEMS mirror 210 is usually separately determined and recorded before the mirror is installed in scanner 208. In some embodiments, the resonant frequency of MEMS mirror 210 may be detected using an acoustic detection, which will be described in detail in this disclosure. In some embodiments of the present disclosure, scanner 208 may also include optical components (e.g., lenses, mirrors) that can focus pulsed laser light into a narrow laser beam to increase the scan resolution and the range to scan object 112.

In some embodiments, receiver 204 may be configured to detect a returned laser beam 211 returned from object 212. The returned laser beam 211 may be in a different direction from beam 209. Receiver 204 can collect laser beams returned from object 212 and output electrical signals reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a photodetector 220. Lens 214 may be configured to collect light from a respective direction in its field of view (FOV) and converge the laser beam to focus before it is received on photodetector 220. At each time point during the scan, returned laser beam 211 may be collected by lens 214. Returned laser beam 211 may be returned from object 212 and have the same wavelength as laser beam 209.

Photodetector 220 may be configured to detect returned laser beam 211 returned from object 212. In some embodiments, photodetector 220 may convert the laser light (e.g., returned laser beam 211) collected by lens 214 into an electrical signal 219 (e.g., a current or a voltage signal). Electrical signal 219 may be generated when photons are absorbed in a photodiode included in photodetector 220. In some embodiments of the present disclosure, photodetector 220 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 200 may also include one or more processor 224. Processor 224 may receive electrical signal 219 generated by photodetector 220. Processor 224 may process electrical signal 219 to determine, for example, distance information carried by electrical signal 219. Processor 224 may construct a point cloud based on the processed information. Processor 224 may include a microprocessor, a microcontroller, a central processing unit (CPU), a graphical processing unit (GPU), a digital signal processor (DSP), or other suitable data processing devices. In some embodiments, processor 224 may control the operation of transmitter 202 and/or receiver 204. In some embodiments, the predetermined resonant frequency of MEMS mirror 210 may be preprogramed in processor 224 or otherwise received by processor 224. Processor 224 may control MEMS mirror 210 to operate under its resonant frequency in order to create tilting movements of MEMS mirror 210 to reflect laser beam 209 at a range of scanning angles.

Figure 3:
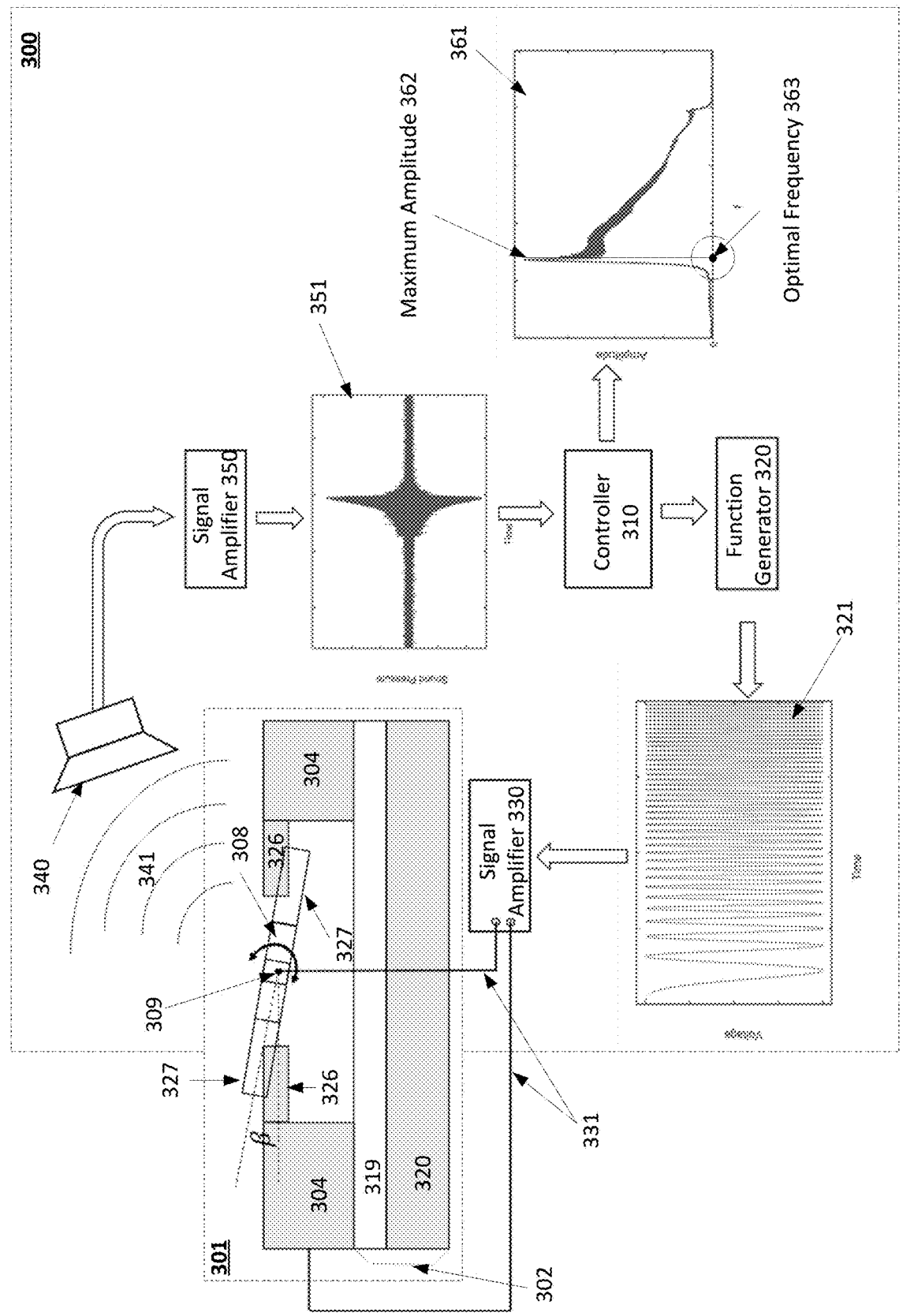
FIG. 3 illustrates a block diagram of an exemplary acoustic detection system for detecting a resonant frequency of a MEMS mirror, according to embodiments of the disclosure.

FIG. 3 illustrates a schematic diagram of an exemplary acoustic detection system 300 for detecting a resonant frequency of a MEMS mirror 308, according to embodiments of the disclosure.

As shown in FIG. 3, MEMS mirror 308 is suspended over substrate 302. When MEMS mirror 308 is in a static state, MEMS mirror 308 can be parallel to substrate 302. In other words, the relative angle between MEMS mirror 308 and substrate 302 can be zero degree. As shown in FIG. 3, when MEMS mirror 308 is in a dynamic state, in which MEMS mirror 308 is titling back and forth (clockwise and counterclockwise), the position of MEMS mirror 308 can be indicated by the relative angle between MEMS mirror 308 and substrate 302, denoted as tilting angle β. MEMS mirror 308 may reach the tilting angle when operating under its resonant frequency.

MEMS mirror 308 may be driven by a pair of actuators. In some embodiments, as shown in FIG. 3, each actuator may include a stator 326 supported by a supporting structure 304, and a rotor 327 that can move in a rotational manner in response to a driving signal with respect to axis 309. In some embodiments, each of stators 326 and rotors 327 may have a comb structure including a plurality of teeth. The teeth of stator 326 and the teeth of rotor 327 may be interleaved but not in physical contact among one another.

Substrate 302 may be used as a base on which other components of mirror assembly 301 can be formed. In some embodiments, substrate 302 may include a single layer, such as a silicon (Si) layer. In other embodiments, substrate 302 may include multiple layers. For example, substrate 302 may include a semiconductor layer 320 and an insulator layer 319. Semiconductor layer 320 may be a silicon (Si) layer, although other semiconductor materials may be used. Insulator layer 319 may be formed on top of semiconductor layer 320. In some embodiments, insulator layer 319 may be a silicon dioxide ($SiO_2$) layer.

The resonant frequency of MEMS mirror 308 may be detected by acoustic detection system 300. In the example shown in FIG. 3, acoustic detection system 300 may include a controller (e.g., controller 310), a function generator (e.g., function generator 320), one or more signal amplifiers (e.g., signal amplifiers 330/350), and an acoustic detector (e.g., acoustic detector 340). The various components may be coupled through wires or wirelessly to communicate with each other. For example, controller 310 may be configured to control the operations of the various other components to collectively detect the resonant frequency of MEMS mirror 308.

Controller 310 may control function generator 320 to generate an electrical signal 321 drive MEMS mirror 308. In some embodiments, electrical signal 321 may be a signal having multiple frequency components to function as a frequency sweeping over a frequency range. For example, Electrical signal 321 generated by function generator 320 may be a chirp signal. The frequency of electrical signal 321 may monotonically increase or decrease within a predetermined range with time. For example, electrical signal 321 may monotonically increase from 1 kHz to 12 kHz. Although electrical signal 321 is illustrated in a sinusoidal waveform in FIG. 3, electrical signal 321 generated by function generator 320 is not limited in that waveform. For example, other waveforms may be operative, such as square, triangular, sawtooth waves.

In some embodiments, electrical signal 321 may be amplified by a signal amplifier 330, controlled by controller 310, to a level suitable to drive MEMS mirror 308. Signal amplifier 330 can be any standard signal amplifier to amplify electrical signal 321 to generate a driving signal 331 for driving MEMS mirror 308. In some embodiments, signal amplifier may be a boost converter used to increase voltage of driving signal 331 to a required voltage signal for driving MEMS mirror 308. For example, voltage of electrical signal 321 may be 3.3V, while operating voltage for mirror assembly 301 may be 5V. In such a case, a boost converter may be used to increase the voltage of driving signal 331 to 5V to drive mirror assembly 301. Driving signal 331 may be applied to the actuators, such as stators 326 and rotors 327.

In some embodiments, after amplification, driving signal 331 contains the same frequency components as those in electrical signal 321. MEMS mirror 308 may oscillate in response to driving signal 331 and swing among varying tilt angles. When the instant frequency of driving signal 331 reaches the resonant frequency of MEMS mirror 308, MEMS mirror 308 may resonant and tilt for a maximum tilt angle.

The oscillating movements of MEMS mirror 308 may generate a sequence of sound waves (e.g., sound wave 341) which can be detected by acoustic detector 340. In some embodiments, an amplitude of sound wave 341 may vary proportionally to the varying tilting angle of MEMS mirror 308. MEMS mirror 308 reaches a maximum tilting angle θ at its resonant frequency, and accordingly the generated sound wave may have a maximum amplitude at the same time.

Acoustic detector 340 may be configured to detect sound wave 341 and generate an acoustic signal. In some embodiments, acoustic detector 340 may include one or more acoustic detection units distributed around MEMS mirror 308 to detect sound wave 341. For example, two or more detection units may be used to detect sound wave 341. Each unit may detect a channel acoustic signal representing sound wave 341 and environmental noises. The multi-channel acoustic signals may be processed later by controller 310.

In some embodiments, acoustic detector 340 may be a microphone with a flat response at the plurality of frequencies. With a flat frequency response, the microphone can be equally sensitive to all frequencies over its entire operating range. In other words, the microphone with a flat frequency response can ensure that no frequencies are exaggerated or attenuated, resulting in a more accurate representation of sound wave 341.

In some embodiments, a signal amplifier 350, controlled by controller 310, may be configured to amplify the multi-channel acoustic signals collected by acoustic detector 340. For example, signal amplifier 350 may be an operation amplifier or single-ended triode (SET) amplifier. In some embodiments, signal amplifier 350 may have a similar structure or configuration as signal amplifier 330. In alternative embodiments, controller 310 may reuse signal amplifier 330 as signal amplifier 350 to amplify the acoustic signals collected by acoustic detector 340.

As shown in FIG. 3, controller 310 may be configured to process amplified acoustic signal 351. In some embodiments, controller 310 may use a blind source separation method to obtain an enhanced acoustic signal. For example, multi-channel nonnegative matrix factorization algorithm may be employed to separate amplified acoustic signal 351 into a separated acoustic channel (hereafter, "enhanced acoustic signal") and a separated interference channel (mainly environmental noises). In some embodiments, controller 310 may simply average the multi-channel acoustic signals in amplified acoustic signal 351 to obtain the enhanced acoustic signal with an increased SNR.

Controller 310 may be further configured to determine a spectrum 361 of the enhanced acoustic signal. In some embodiments, the enhanced acoustic signal can be transformed from a time domain to a frequency domain using frequency decomposition methods such as fast Fourier transform (FFT). As shown in FIG. 3, spectrum 361 may map a range of frequencies and the amplitudes of the corresponding frequency components in the enhanced acoustic signal. Different frequency components may have different amplitudes and the resonant frequency corresponds to the highest amplitude (i.e., the largest frequency component) in spectrum 361.

Controller 310 may analyze spectrum 361 and identify the largest frequency component (e.g., maximum amplitude 362) and its corresponding frequency (e.g., optimal frequency 363) from the spectrum. In some embodiments, optimal frequency 363 may be the resonant frequency of MEMS mirror 308 and therefore can be used as an optimal driving frequency to drive MEMS mirror 308 to reach the maximum tilting angle.

In some embodiments, acoustic detector 340 in acoustic detection system 300 and MEMS mirror 308 (along with the other components of the mirror assembly) can move laterally relative to each other. In some embodiments, the mirror assembly may include multiple MEMS mirrors. Resonant frequency of MEMS mirrors in the same mirror assembly may be different. Acoustic detection system 300 may be configured to sequentially detect the resonant frequencies of the respective MEMS mirrors. For example, the mirror assembly may include two MEMS mirrors (not shown). Acoustic detector 340 may be first placed around a first MEMS mirror. Acoustic detection system 300 is then used to detect the resonant frequency of the first MEMS mirror, based on a first acoustic signal collected by acoustic detector 340 from the first MEMS mirror. Acoustic detector 340 may then be placed around a second MEMS mirror. Acoustic detection system 300 may be similarly employed to detect the resonant frequency of the second MEMS mirror, based on a second acoustic signal collected by acoustic detector 340 from the second MEMS mirror.

In some embodiments, the MEMS mirrors may be arranged in a predetermined pattern and stay statically while acoustic detector 340 is moved laterally from near (e.g., in a proximity of) the first MEMS mirror to near the second MEMS mirror. In some alternative embodiments, acoustic detector 340 may be static, while the first MEMS mirror moves away from acoustic detector 340 and the second MEMS mirror moves towards acoustic detector 340. In some other embodiments, both the MEMS mirrors and acoustic detector 340 may move laterally relative to each other. In some embodiments, the lateral movements of the MEMS mirrors and/or acoustic detector 340 may be automatically driven by actuators at a predetermined frequency, e.g., every 100 microseconds, every second, every 3 second, etc. In some embodiments, the lateral movements may be manually controlled by an operator at desired timing.

Because the disclosed acoustic detection system does not required alignment between acoustic detector 340 and MEMS mirror 308 (as long as they are sufficiently near each other so that acoustic signals can be collected), it is not limited by the tilting angle, and it doesn't require synchronization between the input and output, the resonant frequencies of different MEMS mirrors can be detected at very high frequency (short time period for each detection). Therefore, the disclosed detection systems and methods are practical for high volume and wafer level testing.

Figure 4:
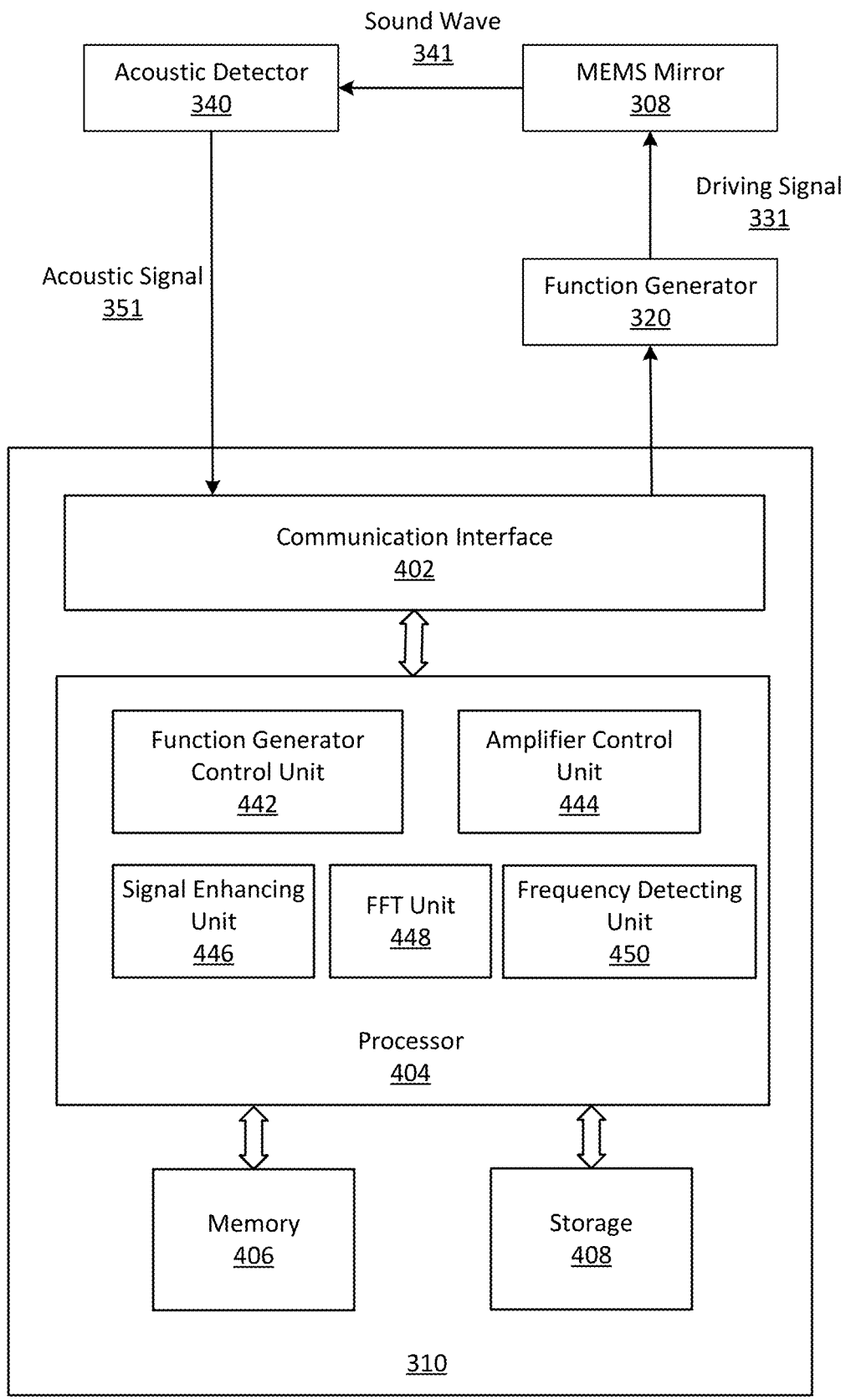
FIG. 4 illustrates a block diagram of an exemplary controller, according to embodiments of the disclosure.

FIG. 4 illustrates a block diagram of an exemplary controller 310, according to embodiments of the disclosure. Consistent with the present disclosure, controller 310 may control function generator 320 to generate an electrical signal have a frequency varying over time (e.g., a chirp signal). Controller 310 may further control acoustic detector 340 to acquire acoustic signal 351 generated by the tilt movement of MEMS mirror 308 driven by driving signal 331. Based on the acoustic signals, controller 310 can determine the resonant frequency and the corresponding maximum tilt angle of MEMS mirror 308. In some embodiments, controller 310 may also control signal amplifier 330 (not shown) to amplify the electrical signal to becoming driving signal 331, and/or signal amplifier 350 (not shown) to amplify the received acoustic signal.

Consistent with some embodiments, as shown in FIG. 3, driving signal 331 may drive MEMS mirror 308 to oscillate.

The movement may generate sound wave 341 which may be detected by acoustic detector 340 as acoustic signal 351. In some embodiments, controller 310 may be configured to enhance acoustic signal 351 and transform the enhanced acoustic signal from the time domain to the frequency domain to obtain a spectrum by applying FFT. Further, controller 310 may determine the resonant frequency of MEMS mirror 308 based on the spectrum of the enhanced acoustic signal.

In some embodiments, as shown in FIG. 4, controller 310 may include a communication interface 402, a processor 404, a memory 406, and a storage 408. In some embodiments, controller 310 may have different modules in a single device, such as an integrated circuit (IC) chip (implemented as an application-specific integrated circuit (ASIC) or a field-programmable gate array (FPGA), or separate devices with dedicated functions. In some embodiments, one or more components of controller 310 may be located along with function generator 320 and/or signal amplifiers 330/350 or may be alternatively in a standalone computing device, in the cloud, or another remote location. Components of controller 320 may be in an integrated device, or distributed at different locations but communicate with each other through a network (not shown). For example, processor 404 may be a processor inside a standalone computing, or a cloud processor, or any combinations thereof.

Communication interface 402 may send signals to and receive signals from components such as function generator 320, signal amplifiers 330/350, and acoustic detector 340 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 402 can be an integrated services digital network (ISDN) card, cable modem, satellite modem, or a modem to provide a data communication connection. As another example, communication interface 402 can be a local area network (LAN) card to provide a data communication connection to a compatible LAN. Wireless links can also be implemented by communication interface 402. In such an implementation, communication interface 402 can send and receive electrical, electromagnetic or optical signals that carry digital data streams representing various types of information via a network.

Processor 404 may include any appropriate type of general-purpose or special-purpose microprocessor, digital signal processor, or microcontroller. Processor 404 may be configured as a separate processor module dedicated to controlling the various components of acoustic detection system 300 and determining the resonant frequency of MEMS mirror 308. Alternatively, processor 404 may be configured as a shared processor module for performing other related or unrelated functions.

As shown in FIG. 4, processor 404 may include multiple modules, such as a function generator control unit 442, an amplifier control unit 444, a signal enhancing unit 446, an FFT unit 448, a frequency detecting unit 450, and the like. These modules (and any corresponding sub-modules or sub-units) can be hardware units (e.g., portions of an integrated circuit) of processor 404 designed for use with other components or to execute a part of a program. The program may be stored on a computer-readable medium, and when executed by processor 404, it may perform one or more functions. Although FIG. 4 shows units 442-450 all within one processor 404, it is contemplated that these units may be distributed among multiple processors located near or remotely with each other.

Function generator control unit 442 may be configured to control the operations of function generator 320, such as but not limited to, determining type and frequency of a signal, generating the determined signal, etc. In some embodiments, function generator control unit 442 can control function generator 320 to generate an electrical signal with frequency varying over time. The range of frequency may include the resonant frequency of MEMS mirror 308. For example, if an intended resonant frequency of MEMS mirror 308 is 5.5 kHz, function generator control unit 442 may control function generator 320 to send a chirp signal with a frequency increasing from 1 kHz to 12 kHz or decreasing from 12 kHz to 1 kHz.

Amplifier control unit 444 may be configured to control a signal amplifier (e.g., signal amplifier 330) to amplify the electrical signal generated by function generator 320. Amplifier control unit 444 may also be configured to control signal amplifier (e.g., signal amplifier 350) to amplify an acoustic signal detected by an acoustic detector (e.g., acoustic detector 340). In some embodiments, amplifier control unit 444 may determine the gain of the signal amplifiers. For example, amplifier control unit 444 may determine the gain of signal amplifier 330 based on the ratio of output (e.g., amplitude of the required driving signal to drive mirror assembly 308) voltage to input (e.g., amplitude of the electrical signal generated by function generator 320).

Signal enhancing unit 446 may be configured to enhance an acoustic signal (e.g., amplified acoustic signal 351) detected by an acoustic detector (e.g., acoustic detector 340). In some embodiments, amplified acoustic signal 351 may include multi-channel signals and signal enhancing unit 446 may average the multi-channel signals to obtain the enhanced acoustic signal with an increased SNR. In some embodiments, signal enhancing unit 446 may use blind signal separation (BSS) method to remove interference in the acoustic signal. Blind source separation may analyze the multi-channel signals collected by acoustic detector units and obtain an enhanced acoustic signal containing the useful oscillation information of the MEMS mirror. Many methods of blind signal separation may be implemented by signal enhancing unit 446 to obtain the enhanced acoustic signal, such as but not limited to, principal components analysis, independent component analysis, non-negative matrix factorization, etc.

FFT unit 448 may be configured to transform the enhanced acoustic signal from a time domain to a frequency domain, e.g., using FFT. In some embodiments, FFT unit 448 may execute a preprogramed FFT module to perform the transform. A spectrum (e.g., spectrum 361) of the enhanced acoustic signal may be obtained for detecting a resonant frequency of the MEMS mirror.

Frequency detecting unit 450 may be configured to detect a highest amplitude (e.g., maximum amplitude 362) from the spectrum. The highest amplitude corresponds to the oscillation of MEMS mirror 308 when it reaches the maximum titling angle at the resonant frequency. Thus, the corresponding frequency of the highest amplitude in spectrum 361 can be determined as the resonant frequency of the MEMS mirror. In some embodiments, the detected resonant frequency and the maximum tilting angle may be saved as a pair by controller 310. The resonant frequency and the maximum tilting angle may be associated with MEMS mirror 308 and later be programmed into processor 224 of LiDAR system 200, in which MEMS mirror 308 is employed.

Memory 406 and storage 408 may include any appropriate type of mass storage provided to store any type of information that processor 404 may need to operate. Memory 406 and storage 408 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Memory 406 and/or storage 408 may be configured to store one or more computer programs that may be executed by processor 404 to perform control and signal processing functions of controller 310 disclosed herein. For example, memory 406 and/or storage 408 may be configured to store program(s) that may be executed by processor 404 to control operations of function generator 320, signal amplifiers 330/350, and acoustic detector 340. Further, memory 406 and/or storage 408 may store computer programs that may be executed by processor 404 to perform algorithms of signal enhancement and fast Fourier transform. For example, memory 406 and/or storage 408 may store program(s) that may be executed by processor 404 to perform blind source separation to enhance acoustic signal 351 and apply fast Fourier transform to the enhanced acoustic signal.

Memory 406 and/or storage 408 may be further configured to store information and data used by processor 404. For instance, memory 406 and/or storage 408 may be configured to store acoustic data acquired by acoustic detector 340. Memory 406 and/or storage 408 may also store intermediate data such as an enhanced acoustic signal produced by signal enhancing unit 446, a spectrum generated by FFT unit 448, and a determined resonant frequency of MEMS mirror 308. The various types of data may be stored permanently, removed periodically, or disregarded immediately after each scan.

Figure 5:
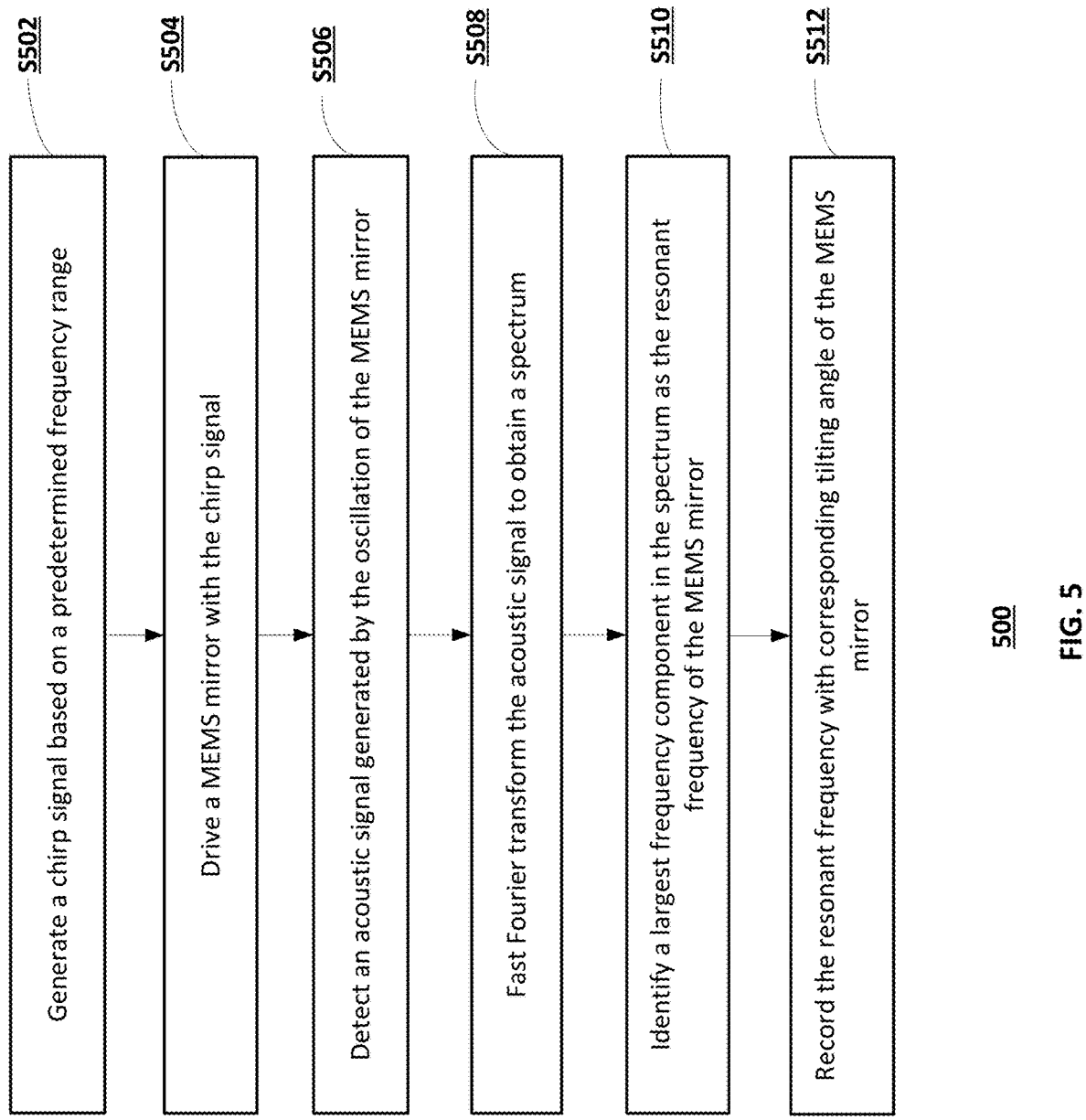
FIG. 5 illustrates a flow chart of an exemplary method for detecting resonant frequencies of a MEMS mirror, according to embodiments of the disclosure.

FIG. 5 illustrates a flow chart of an exemplary method 500 for detecting a resonant frequency of a MEMS mirror, according to embodiments of the disclosure. It is to be appreciated that some of the steps may be optional. Further, some of the steps may be performed simultaneously, or in a different order than shown in FIG. 5.

In step S502, an electrical signal (e.g., electrical signal 321) having a frequency varying over time (e.g., a chirp signal) can be generated by a function generator (e.g., function generator 320). Consistent with some embodiments, the function generator may be controlled by a controller (e.g., controller 310). For example, controller 310 may control function generator 320 to generate electrical signal 321 within a predetermined frequency range. The frequency range may include the resonant frequency of the MEMS mirror (e.g., MEMS mirror 308).

In step S504, the electrical signal may be used for driving the MEMS mirror. Consistent with some embodiments, a signal amplifier (e.g., amplifier 330), controlled by the controller (e.g., controller 310), may be used to amplify the chirp signal (e.g., electrical signal 321) for driving the MEMS mirror. The controller may also determine the gain of the amplifier. For example, a boost converter (as an example of amplifier 330) may be used to increase the voltage of electrical signal 321 to a required operation voltage for driving MEMS mirror 308.

In step S506, the driving signal may drive the MEMS mirror to oscillate around its axis. The oscillation may create a sequence of sound waves (e.g., sound wave 341) which may be detected by an acoustic detector (e.g., acoustic detector 340) placed near the oscillating MEMS mirror. In some embodiments, the acoustic detector may include multiple detector units to acquire multi-channel acoustic signals which may be processed by the controller to obtain an enhanced acoustic signal (e.g., enhanced acoustic signal 351). In some embodiments, the controller may further control a signal amplifier (e.g., signal amplifier 350) to amplify the acquired acoustic signal(s).

In step S508, the enhanced acoustic signal may be transformed from the time domain to the frequency domain using fast Fourier transform. Consistent with some embodiments, an FFT may be used to transform the enhanced acoustic signal into a spectrum (e.g., spectrum 361). For example, different frequency components may have different amplitudes in spectrum 361.

In step S510, the resonant frequency of the MEMS mirror may be obtained by identifying the largest frequency component (e.g., maximum amplitude 362) in the spectrum. For example, maximum amplitude 362 is the highest amplitude in spectrum 361 and its corresponding frequency, e.g., optimal frequency 363, may be identified as the resonant frequency of MEMS mirror 308.

In step S512, based on the detected resonant frequency and the corresponding amplitude in the spectrum, the maximum tilting angle of the MEMS mirror may be computed. A pair of the resonant frequency and the maximum tilting angle may be recorded in the controller. For example, controller 310 may further save the pair of optimal frequency 363 and its maximum tilting angle associated with MEMS mirror 308 in memory 406 and/or storage 408. In some embodiments, the resonant frequency and the corresponding tilting angle of MEMS mirror 308 may be recorded in a lookup table, which is later programed in processor 224 of LiDAR system 200. Processor 224 may look up the resonant frequency and the tilting angle to control the operation of MEMS mirror 308 in LiDAR system 200.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A method for detecting a resonant frequency of an optical beam-steering device, comprising:

driving the optical beam-steering device with a driving signal oscillating at a plurality of frequencies;

detecting, by an acoustic detector, an acoustic signal caused by a movement of the optical beam-steering device;

analyzing a spectrum, by a controller, of the acoustic signal to identify an amplitude corresponding to a movement of the optical beam-steering device reaching its maximum tilting angle;

determining, by the controller, the resonant frequency of the optical beam-steering device based on the amplitude corresponding to the movement of the optical beam-steering device reaching its maximum tilting angle; and recording the resonant frequency corresponding to the movement of the optical beam-steering device reaching its maximum tilting angle.

2. The method of claim 1, wherein the driving signal is a chirp signal.

3. The method of claim 1, further comprising generating the driving signal using a function generator and amplifying the driving signal using a signal amplifier.

4. The method of claim 1, wherein the spectrum is determined by applying a fast Fourier transform (FFT) to the acoustic signal.

5. The method of claim 1, wherein determining the resonant frequency further comprises identifying a largest frequency component in the spectrum.

6. The method of claim 1, wherein the optical beam-steering device is a MEMS mirror.

7. The method of claim 1, wherein the acoustic detector is a microphone with a flat response at the plurality of frequencies.

8. The method of claim 1, wherein the acoustic detector includes multiple detection units distributed around the optical beam-steering device, each detection unit detecting a channel acoustic signal, wherein the controller is further configured to determine the acoustic signal by aggregating the channel acoustic signals.

9. The method of claim 1, further comprising moving at least one of the acoustic detector or the optical beam-steering device laterally relative to each other.

10. The method of claim 1, further comprising:
determining, by the controller, the maximum tilting angle of the optical beam-steering device based on the resonant frequency and the identified amplitude of the spectrum; and
recording the maximum tilting angle of the optical beam-steering device.

11. A system for detecting a resonant frequency of an optical beam-steering device, comprising:
an acoustic detector configured to detect an acoustic signal caused by a movement of the optical beam-steering device when driven by a driving signal oscillating at a plurality of frequencies;
a controller operatively coupled to the acoustic detector and configured to:
analyze a spectrum of the acoustic signal to identify an amplitude corresponding to a movement of the optical beam-steering device reaching its maximum tilting angle; and
determine the resonant frequency of the optical beam-steering device based on the amplitude corresponding to the movement of the optical beam-steering device reaching its maximum tilting angle; and
record the resonant frequency corresponding to the movement of the optical beam-steering device reaching its maximum tilting angle.

12. The system of claim 11, wherein the acoustic detector is a microphone with a flat response at the plurality of frequencies.

13. The system of claim 11, further comprising a function generator configured to generate the driving signal for driving the optical beam-steering device, and wherein the controller is further configured to control the function generator to generate the driving signal.

14. The system of claim 13, wherein the driving signal is a chirp signal.

15. The system of claim 11, wherein the spectrum is determined by applying an FFT to the acoustic signal.

16. The system of claim 11, wherein to determine the resonant frequency, the controller is further configured to identify a largest frequency component in the spectrum.

17. The system of claim 11, wherein the controller is further configured to determine the maximum tilting angle of the optical beam-steering device based on the resonant frequency and the identified amplitude of the spectrum; and
record the maximum tilting angle of the optical beam-steering device.

18. The system of claim 11, wherein the optical beam-steering device is a MEMS mirror.

19. A method for detecting resonant frequencies of MEMS mirrors, comprising:
placing an acoustic detector in a proximity of a first MEMS mirror;
driving the first MEMS mirror with a first driving signal oscillating at a plurality of frequencies;
detecting, by the acoustic detector, a first acoustic signal caused by a movement of the first MEMS mirror at its maximum tilting angle;
determining, by a controller, a first resonant frequency of the first MEMS mirror based on the first acoustic signal caused by a first movement of the first MEMS mirror reaching its maximum tilting angle;
recording the first resonant frequency corresponding to the movement of the first MEMS mirror reaching its maximum tilting angle;
moving the acoustic detector into a proximity of a second MEMS mirror;
driving the second MEMS mirror with a second driving signal;
detecting, by the acoustic detector, a second acoustic signal caused by a movement of the second MEMS mirror reaching its maximum tilting angle;
determining, by the controller, a second resonant frequency of the second MEMS mirror based on the second acoustic signal caused by a second movement of the second MEMS mirror reaching its maximum tilting angle; and
recording the second resonant frequency corresponding to the second movement of the second MEMS mirror reaching its maximum tilting angle.

20. The method of claim 19, wherein the acoustic detector is moved at a predetermined frequency.

* * * * *